United States Patent [19]

Yamazaki et al.

[11] 4,424,770
[45] Jan. 10, 1984

[54] LOW BOILING POINT MEDIUM EVAPORATOR

[75] Inventors: Haruyuki Yamazaki, Tokai; Yasuaki Akatsu; Seiichiro Sakaguchi, both of Hitachi, all of Japan

[73] Assignee: The Agency of Industrial Science and Technology, Tokyo, Japan

[21] Appl. No.: 308,163

[22] Filed: Oct. 2, 1981

[30] Foreign Application Priority Data

Oct. 9, 1980 [JP] Japan ................................ 55-140472

[51] Int. Cl.³ ........................ F22B 37/26; B01D 45/12
[52] U.S. Cl. .................................... 122/488; 122/491; 62/471
[58] Field of Search .................. 62/471; 122/488, 489, 122/491, 492

[56] References Cited

U.S. PATENT DOCUMENTS

| | | | |
|---|---|---|---|
| 1,853,958 | 4/1932 | Connelly | 122/488 |
| 2,821,966 | 2/1958 | Raynor | 122/491 |
| 2,859,596 | 11/1958 | Evans | 62/471 |
| 4,077,362 | 3/1978 | Hawkins | 122/491 |

Primary Examiner—Henry C. Yuen
Attorney, Agent, or Firm—Birch, Stewart, Kolasch & Birch

[57] ABSTRACT

The present invention provides a low boiling point medium evaporator which generates low boiling point medium vapor in the mixture of two components with different boiling points by heating at the risers and mixes said heated two component mixture and said low boiling point medium liquid supplied from the outside of the system and has at least one device provided at the outlet portion of said risers and used both as a heat exchanger to generate saturated vapor of said low boiling point medium vapor by mixing said low boiling point medium liquid and the two phase flow comprised said low boiling point medium vapor and said mixture and passing said two phase flow through said low boiling point medium vapor and as a cyclone to separate said saturated vapor and said mixture.

1 Claim, 4 Drawing Figures

LOW BOILING POINT MEDIUM EVAPORATOR

BACKGROUND OF THE INVENTION

1. Field of the Invention

The present invention relates to an evaporator, especially to a low boiling point medium evaporator which generates a low boiling point medium vapor from the two component mixture with different boiling points, by heating.

2. Description of the Prior Art

FIG. 1 shows the evaporate of the prior art which evaporates the low boiling point medium from a two component mixture with different boiling points.

The upper header 12 and the lower header 14 are connected by risers 16 with small diameter and a down comer 18 with a large diameter. The outlets of the risers 16 are provided at the duct 20 in the upper dram 12, and cyclone separators 22 are mounted at the both sides of the duct 20. An exhaust pipe 24 and a supply pipe 26 are mounted on the upper dram 12.

In the risers 16, two component mixture 101 is heated with heating gas 104 and the low boiling point medium vapor 102 is generated and the vapor-liquid two phase flow is guided into the duct 20 of the upper dram 12. This is separated into the low boiling point medium vapor 102 and the two component mixture 101 by the cyclone separators 22. The separated low boiling point medium vapor 102 is discharged from the exhaust pipe 24. The low boiling point medium liquid 103 is mixed into the remaining two component mixture 101 from the supply pipe 26, and, after heat exchange, it is circulated through the down comer 18 to the lower dram 14.

The low boiling point medium 102 and 103 can be freon R 113, for example, and the two component mixture 101 can be the mixture of freon R 113 and polyol ester oil. The reason of adopting the two component mixture 101 of oil and freon as a heat exchange medium is that durability to thermal decomposition of the low boiling point medium is accelerated and that it can be exposed to higher temperature than the low boiling point pure medium by adding oil to the low boiling point medium. In the said conventional art, however, the heated and generated vapor is the low boiling point pure medium and has a defect of being easily decomposed by heat because it is superheated vapor of high temperature. Moreover, another defect is that the oil-rich two component mixture 101 and the low boiling point medium liquid 103 are not mixed satisfactorily at the upper dram 12.

Taking the above defects into consideration, the purpose of the present invention is to offer the low boiling point medium evaporator which prevents thermal decomposition of the low boiling point medium vapor without lowering the pressure drastically and carries out mixing the two component mixture and the low boiling point medium liquid satisfactorily.

SUMMARY OF THE INVENTION

According to the present invention, the above purposes are attained by providing a device to be used as a cyclone separator and as a heat exchanger arranged to make the vapor-liquid two phase flow pass through the low boiling point medium liquid in order to increase the efficiency of generating low boiling point medium saturated vapor.

DETAILED DESCRIPTION OF THE INVENTION

Figure 1:
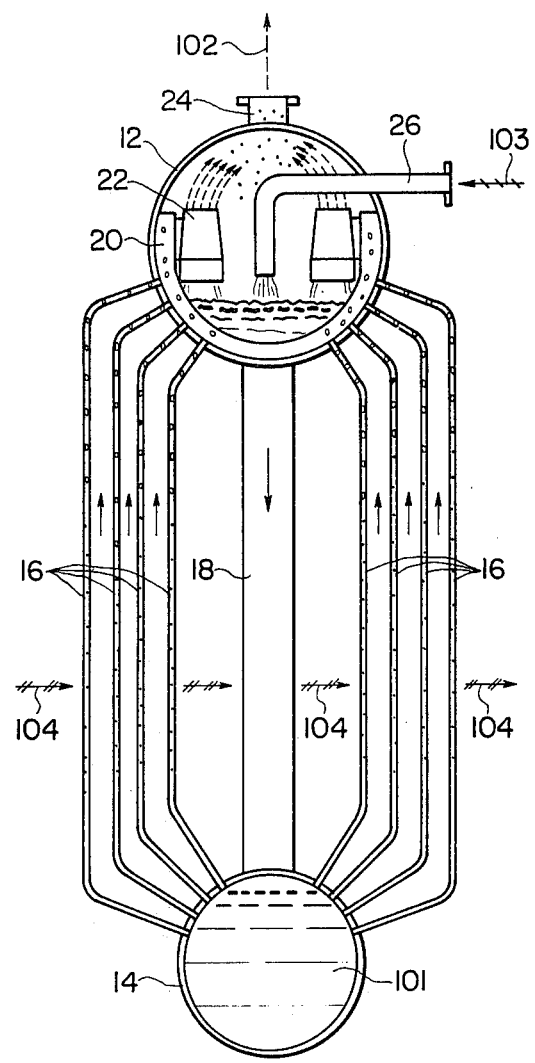
FIG. 1 is structure drawing showing the conventional low boiling point medium evaporator.
Figure 2:
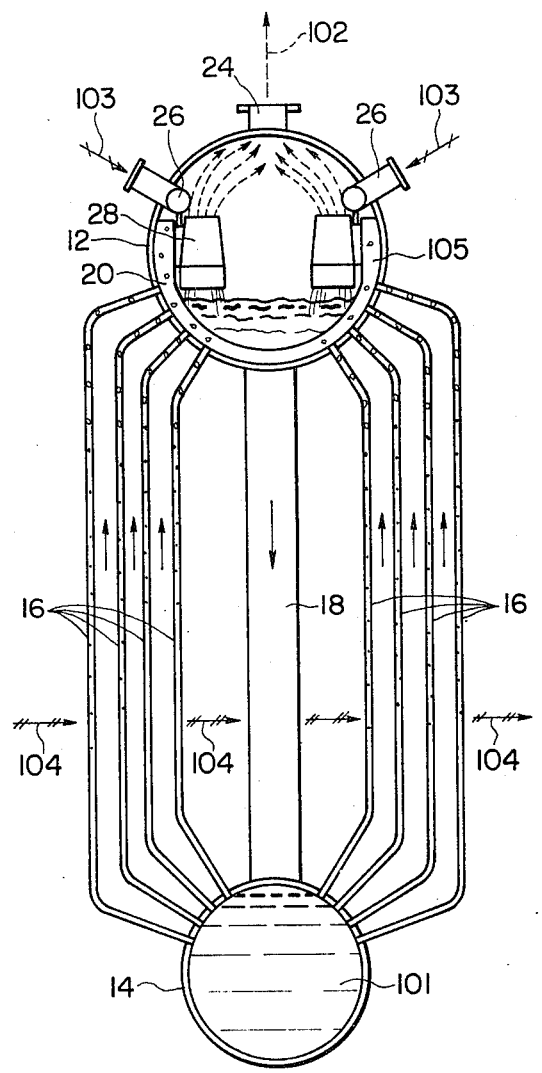
FIG. 2 is a structure drawing showing one embodiment of the low boiling point medium evaporator according to the present invention.

The present invention will now be described by referring to the drawings as follows:

FIG. 2 is a drawing of a structure showing the embodiment of the low boiling point evaporator based on the present invention. Elements of FIG. 2 which are the same as corresponding elements in FIG. 1 are indicated with the same numbers.

The upper dram 12 and the lower dram 14 are connected by the risers 16 and the down comer 18. The duct 20, communicating with the outlets of the risers 16 is provided inside the upper dram 12. A direct type heat exchanger 28 is mounted on both ends of the duct 20, and in the upper part of the direct type heat exchanger 28, the supply pipes 26 are provided. In the upper portion of the upper header 12, the exhaust pipe 24 is mounted.

Details of this embodiment are as follows:

The two component mixture 101 from the lower dram 14 is guided into the risers 16 and heated with heating gas 104, and the low boiling point medium vapor 102 is generated from the two component mixture 101. This vapor being generated, the vapor-liquid two phase flow 105 of the two component mixture 101 and the low boiling point medium vapor 102 go up through the risers 16 and guided into the duct 20 inside the upper dram 12, and the vapor-liquid two phase flow 105 passes through the direct type heat exchanger 28 in which heat exchange and separation of vapor from liquid are carried out by having the two phase flow 105 directly contact with the low boiling point medium liquid 103. Separated low boiling point medium vapor 102 is discharged through the exhaust pipe 24. The two component mixture 101 goes down through the down comer 18 to the lower header 14 and circulates of itself and repeats the same process.

In this embodiment, the vapor-liquid two phase flow at the outlet of the risers 16 and the low boiling point medium liquid 103 make direct contact with each other in the direct heat exchanger for the following purposes; to lower the temperature without lowering the pressure in order to prevent thermal decomposition because the low boiling point medium vapor; 102 at the outlet of the risers 16 is superheated vapor and to satisfactorily mix the oil-rich two component mixture 101 and the low boiling point medium liquid 103.

Figure 3:
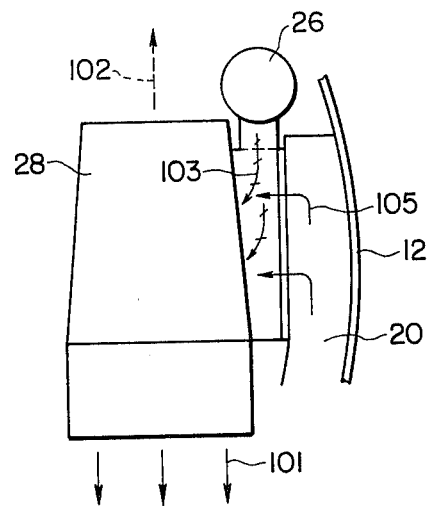
FIG. 3 is the enlarged side view of the direct type heat exchanger portion shown in FIG. 2.
Figure 4:
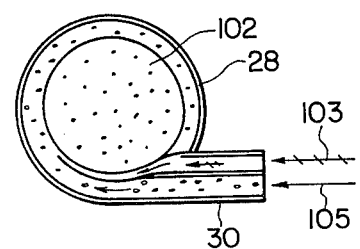
FIG. 4 is the plane view of the direct type heat exchanger shown in FIG. 2.

FIG. 3 and FIG. 4 are enlarged views of the direct type heat exchanger 28 mentioned above. The vapor-liquid two phase flow 105 is blown from the duct 20 into the direction of contact line through the nozzle 30 to the cylindrical direct type heat exchanger 28. On the other hand, the low boiling point medium liquid 103 is blown from the supply pipe 26 being along the axis direction of the upper dram 12 to the direct type heat exchanger 28 through the nozzle 30. The nozzle 30 has a double-layer structure, and the vapor-liquid two phase flow 105 passes through the outer side and the low boiling point medium liquid 103 passes through the inner side. And thus direct contact heat exchange between the two is carried out inside the cylindrical direct type heat exchanger 28.

According to the embodiment, by the use of the direct type heat exchanger 28, the low boiling point medium vapor in the vapor-liquid two phase flow 105 passes through liquid film of the low boiling point medium liquid 103, so that the low boiling point medium vapor 102 is discharged from the exhaust pipe 24 as saturated vapor. This is effective in preventing thermal decomposition of the low boiling point medium vapor 102. And, in the direct type heat exchanger, the specific gravity of the vapor-liquid two phase flow 105 is smaller than that of the low boiling point medium liquid 103 and, therefore, the two can be satisfactorily mixed because of the difference of their centrifugal forces.

As clear from the above description of the present invention, it is possible to offer a low boiling point medium evaporator which can prevent thermal decomposition of the low boiling point medium vapor without lowering the pressure and, at the same time, mix the two component mixture and the low boiling point medium liquid satisfactorily by utilizing the apparatus as a cyclone separator and as a heat exchanger in which the vapor-liquid two phase flow passes through the low boiling point liquid medium.

What is claimed is:

1. An apparatus for generating a low boiling point vapor medium from a liquid mixture of two components with different boiling points which comprises, a lower dram adapted to contain the two component liquid mixture and an upper dram, at least one down comer connecting the upper dram with the lower dram for returning the liquid mixture from the upper dram to the lower dram, a header duct disposed within the upper dram, a plurality of risers connecting the lower dram with the header duct in the upper dram, means for heating the risers and the two component liquid mixture conveyed therethrough whereby a low boiling point vapor medium is generated from said two component liquid forming a two phase vapor-liquid mixture composed of a low boiling point vapor medium and the two phase vapor-liquid medium, said mixture being transferred from said risers to said header duct in the upper dram, an exhaust conduit means connected to said upper dram for removing the low boiling point vapor medium from said upper dram, supply conduit means for returning the low boiling point liquid medium to the upper dram, at least one cyclone separator disposed within the upper dram, said cyclone separator being provided with an inlet nozzle containing two side-by-side channels, one of said channels communicating with said supply conduit and the other of said channels communicating with the header duct, wherein the two phase vapor-liquid flow emanating from the header duct is tangentially mixed in the cyclone separator with the low boiling point liquid medium flow introduced through the supply conduit and heat exchange is carried out between the two flows by direct contact of the two flows resulting from the circulating motion of said two flows in the cyclone separator, whereby the temperature of the mixture in the cyclone separator is lowered without lowering the pressure and also the mixture in the cyclone separator is thoroughly mixed with the low boiling point liquid medium.

* * * * *